United States Patent
Albus et al.

(10) Patent No.: US 6,620,092 B2
(45) Date of Patent: Sep. 16, 2003

(54) PROCESS AND APPARATUS FOR VITRIFICATION OF HAZARDOUS WASTE MATERIALS

(75) Inventors: James F. Albus, Newtown, PA (US); Scott A. Santora, Hammonton, NJ (US)

(73) Assignee: Chem Pro, Newtown, PA (US)

( * ) Notice: Subject to any disclaimer, the term of this patent is extended or adjusted under 35 U.S.C. 154(b) by 0 days.

(21) Appl. No.: 09/853,853

(22) Filed: May 11, 2001

(65) Prior Publication Data

US 2002/0169352 A1 Nov. 14, 2002

(51) Int. Cl.[7] .................................................. A62D 3/00
(52) U.S. Cl. .......................... 588/252; 588/256; 588/11; 405/128.9
(58) Field of Search .......................... 65/134.8; 588/252, 588/256, 900, 11, 234; 34/375; 373/27; 405/128.9

(56) References Cited

U.S. PATENT DOCUMENTS

| | | | | |
|---|---|---|---|---|
| 2,977,194 A | * | 3/1961 | Loeding et al. ............. 423/122 |
| 3,120,493 A | * | 2/1964 | Clark et al. ................. 252/625 |
| 3,185,554 A | * | 5/1965 | Sweo et al. ..................... 65/27 |
| 4,214,375 A | | 7/1980 | Albus et al. |
| 4,226,027 A | | 10/1980 | Albus |
| 4,244,717 A | | 1/1981 | Butcher |
| 4,341,639 A | * | 7/1982 | Santora ....................... 210/673 |
| 4,344,872 A | * | 8/1982 | Thiele ................. 159/DIG. 12 |
| 4,353,725 A | * | 10/1982 | Hohman et al. ................ 65/27 |
| 5,017,200 A | | 5/1991 | Price et al. |
| 5,096,476 A | | 3/1992 | Hunsberger |
| 5,322,530 A | * | 6/1994 | Merriam et al. ............... 44/608 |
| 5,403,365 A | * | 4/1995 | Merriam et al. ............. 423/107 |
| 5,424,042 A | * | 6/1995 | Mason et al. ................ 422/159 |
| 5,603,684 A | | 2/1997 | Wetmore et al. |
| 5,611,766 A | * | 3/1997 | Carle et al. .................... 588/11 |
| 5,662,579 A | | 9/1997 | Bickford |
| 5,873,675 A | | 2/1999 | Wetmore et al. |
| 5,887,797 A | | 3/1999 | Elliott |
| 6,258,994 B1 | * | 7/2001 | Jantzen et al. ................ 588/12 |
| 6,315,810 B1 | * | 11/2001 | Mechtersheimer .......... 588/256 |

* cited by examiner

*Primary Examiner*—Robert J. Sandy
*Assistant Examiner*—Katherine Mitchell
(74) *Attorney, Agent, or Firm*—Howson and Howson

(57) ABSTRACT

A process for vitrifying waste material containing environmentally hazardous metals or metal compounds includes drying a waste material using a flash dryer, where the drying is carried out at a temperature low enough to prevent volatilization of hazardous metals and metal compounds contained in the waste material. Preferably, more than about 95% of the water is removed form the waste material. The dried waste material is transferred from the flash dryer into a melting vessel, melted, collected and cooled to form a vitrified mass of waste material. Gases produced during the process of the invention are filtered, treated, and released into the atmosphere.

19 Claims, 1 Drawing Sheet

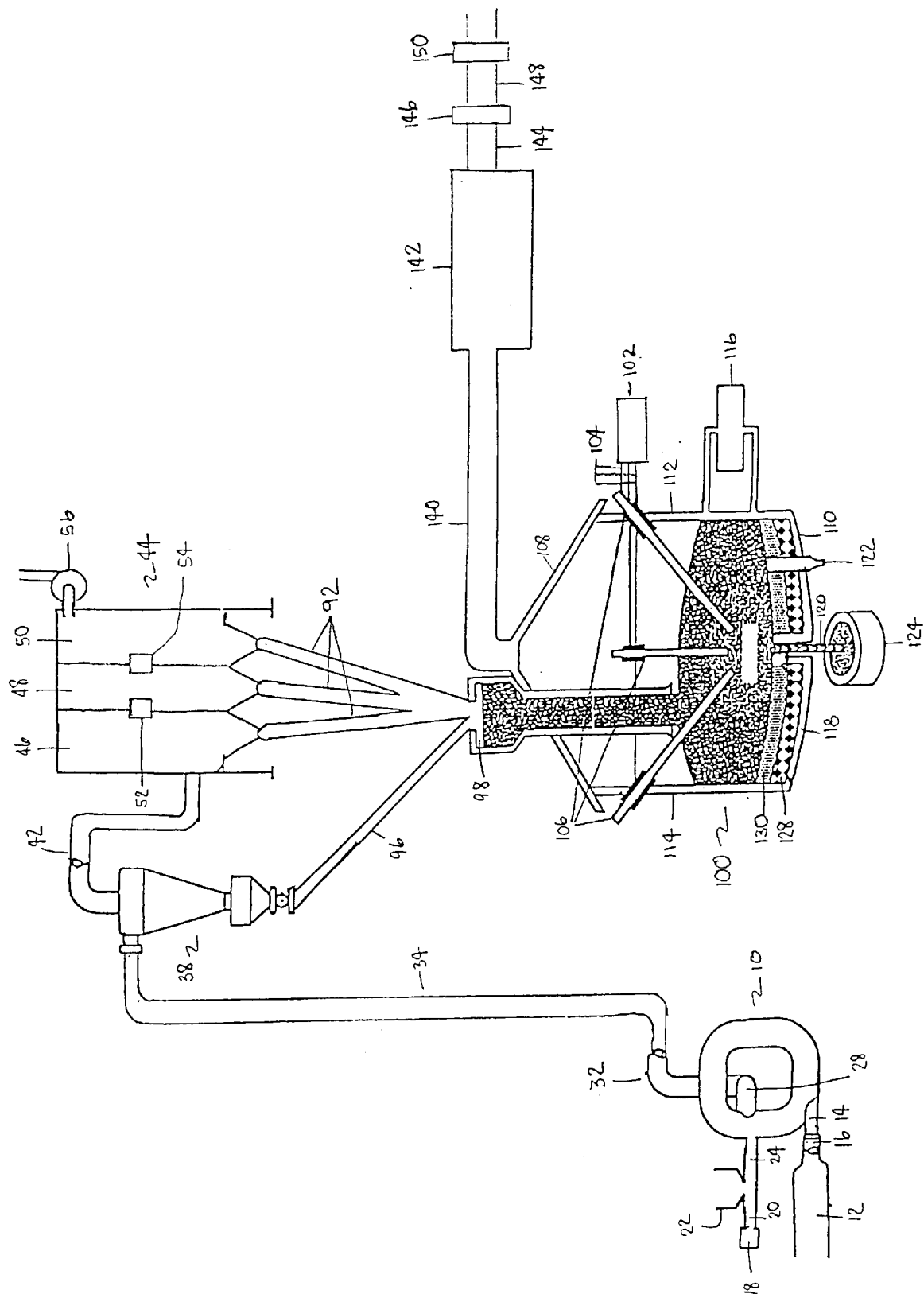

PROCESS AND APPARATUS FOR VITRIFICATION OF HAZARDOUS WASTE MATERIALS

Vitrification of waste material is becoming the preferred route for the treatment and remediation of non-combustible wastes. Vitrification reduces the amount of hazardous waste generated from solid waste combustion furnaces. A wide variety of non-combustible waste, including (but not limited to) contaminated soils, process waste and post combustion residuals (ashes) containing inorganic as well as organic compounds can be effectively treated and incorporated into a siliceous (glass) mass without significant deterioration of the ability of the glass to lock up and retain the inorganic contaminants, in effect, permanently. Permanent retention of contaminants by vitrification refers to retention in which any leakage of contaminants is so slow that no detectable adverse environmental effects are produced.

Ex situ vitrification, as opposed to in situ vitrification, has the advantage of increased control before and during processing and ultimately increased control of the consistency of the vitrified product. A number of vitrification processes have been utilized, and they include those described in U.S. Pat. Nos. 5,873,675; 5,603,684; and 5,662,579. A general summary is provided in the EPA Handbook entitled "Vitrification Technologies for Treatment of Hazardous and Radioactive Waste".

Various problems are encountered when using the vitrification processes currently utilized in the art. The greatest problem is the escape of hazardous, volatile inorganic and organic materials during pre-treatment of waste material, as well as during vitrification. Particularly troublesome is the escape of hazardous metal compounds such as mercury, arsenic, antimony, zinc, cadmium, chromium, and lead compounds.

Some waste materials are treated prior to undergoing vitrification. Crushers and grinders are typically used to increase the surface area of the waste material, thereby permitting the use of more consistent, and lower, temperatures during the melt process. However, this method, which involves various residence times, not only requires high amounts of energy, but has the undesired side effect of volatilizing hazardous compounds due to increased temperatures applied during pretreatment. For example, when rotary dryers are utilized to pretreat or dry the waste material, a dried, agglomerated product is obtained, reducing the surface area of the waste material. The temperatures therefore required to dry the waste material using rotary dryers are basically too high, and consequently the adsorbent material used to filter dust particles from the exhaust gases is rendered ineffective. Rendering the adsorbent material ineffective allows volatile hazardous materials to escape, and therefore additional techniques must be used to trap, treat, and dispose of the released hazardous materials.

During exposed conventional glass tank surface vitrification, volatile compounds can escape from the melt. This is believed to be due in part to the presence of water and in part due to residual carbon from degraded, waste-associated, organic materials. Upon melting of the waste material residual, carbon causes various toxic, inorganic metal oxides to become reduced to their zero valent state, which are generally more volatile. The combination of heated, entrapped water vapor, carbon-water shift reaction by-products (carbon monoxide and hydrogen) and oxidized combustion gases ($CO_2$) cause the more volatile toxic metals to escape the melt and subsequently form gaseous element fumes and/or compounds. Not only do these materials exit the melted waste material in gaseous form, but they require additional steps to recover and dispose of the hazardous materials. Such hazardous materials may contain metals or metal compounds which are environmentally dangerous. The disposal of such materials is therefore closely regulated by governmental agencies.

It is an object of this invention to provide a process and apparatus for treating waste materials containing volatile organic and inorganic compounds, wherein the waste material is melted in a cold top (cap) furnace and ultimately converted into a benign, innocuous, disposable vitrified mass or product, and wherein, in the course of melting and vitrification, leakage of volatile metals and compounds into the environment is greatly reduced.

In accordance with the invention, the-waste is pretreated to decrease its water content without significant volatilization of low volatile hazardous compounds, that is, compounds that begin to off-gas or volatilize at relatively low temperatures. The quantity of gaseous material generated during the vitrification process is reduced, the thermal degradation of organic compounds in the cold top waste feed system is more uniformly controlled, the amount of volatile inorganic material released into the atmosphere is greatly reduced, and additional waste management procedures are obviated.

The processes and apparatuses of the present invention address the above-mentioned problems encountered with vitrification processes.

SUMMARY OF THE INVENTION

In accordance with the invention, a process for vitrifying a waste material containing environmentally hazardous metals or metal compounds is provided. The process includes drying the waste material using a flash dryer, preferably of the continuous loop design, where the drying is carried out at a temperature low enough to prevent substantial volatilization of hazardous metals and metal compounds contained in the waste material. The process further includes transferring the dried waste material from the flash dryer into a melting vessel, preferably utilizing either pneumatic or mechanical conveying methods, melting the waste material in the melting vessel, collecting the melted waste material, and slow, regulated cooling of the melted waste material to form vitrified finished product.

In a preferred embodiment of the invention, the flash dryer removes more than about 95% of the water from the starting waste material. The waste material may also be premixed with an additive prior to drying.

During the melting step, an electric current is established within the waste material to melt the core of the waste material, and a cold top is formed during the melting step. Exhaust gases produced during the melting step may be vented, filtered, and reintroduced into the melt unit. The resultant melted waste material is collected in an insulated mold to form waste glass by-products of various shapes and sizes.

An apparatus for vitrifying a waste material is also provided. The apparatus includes a continuous loop, direct-fired flash dryer, a metallic melting vessel, a conveyor for transferring the waste material from the flash dryer to the melting vessel, at least one port, and preferably several ports, in the melting vessel for releasing melted waste materials, and an insulated mold for collecting the melted waste materials. A preferred melting vessel has at least one port for molten glass and one port for molten metal.

In the apparatus of the invention, a means for removing gaseous materials from the dryer or melting vessel may also be included.

Other objects, details, advantages and modifications of the invention will be apparent from the following detailed description when read in conjunction with the drawings.

BRIEF DESCRIPTION OF THE DRAWING

The single FIGURE is a schematic view of the pretreating and vitrifying apparatus of the invention, including a material feed apparatus, a flash dryer a cyclone separator, a bag house, a melting vessel and an air pollution control system connected to the melting vessel.

DETAILED DESCRIPTION OF THE INVENTION

A variety of waste materials may be treated using the process of the invention. Among these materials include radioactive waste, contaminated soils, contaminated river sediment or other contaminated solids, incinerator ashes, industrial waste, medical waste, underground storage tank waste, drummed waste, shipboard waste, and asbestos waste, among others. Such waste material may contain metals or metal compounds which are environmentally hazardous, including mercury, lead, cadmium, zinc, antimony and chromium, and compounds containing these metals.

As used herein, the term "metal compound" refers to describe any chemical compound in which a metal is bound to or associated with another element, and includes the term "metal complex". Similarly, the term "metal" refers to a metal in its zero-valent or elemental state. Zero-valent metals react with various chemical compounds to form metal compounds.

In accordance with the invention waste material is dried prior to vitrification. In order to minimize dryer wear, the waste material can be treated prior to drying, by removing ferrous metals and compounds using magnetic techniques. The iron-depleted waste material is then presized by crushing, grinding and screening. The material is preferably presized to a top size of ¼ inch, with 99% of the material passing through a ¼ inch screen, 90 to 95% being less than 10 mesh and 75 to 90% being less than 20 mesh.

The presized waste material can then be mixed with one or more additives. The selection of the additive is dependent upon the desired properties of the final vitrified waste material as well as the composition of the material to be treated. Typical additives include fly ash, bottom ash, alumina, silica, iron oxide, feldspar, dolomite, limestone, soda ash, borosilicate, and metal oxides, but other additives may be selected by one of skill in the art.

The pretreated waste material is gravity fed a a controlled rate into dryer 10. The size of the dryer depends on the water content of the raw waste material and the requirements of the melt vessel downstream from the dryer. In general, the dryer should be capable of delivering from 20 to 100 tons of dried material per day. Assuming an average moisture removal of 15% and a safety factor, the dryer should be sized to handle about 25% to 50% over the melt vessel requirements. Thus, in typical installations, the feed rate to the dryer will be in the range from 30 to 150 tons per day of wet material.

The material feed system and flash dryer described in U.S. Pat. Nos. 4,214,375 and 4,226,027 and are incorporated herein by reference. Preferably the flash dryer of the invention is a continuous loop dryer. In a preferred embodiment, the flash dryers of the invention are equipped with ceramic wear-resistant liners which may be replaced as needed over time.

Using a blower 18 capable of producing a positive pressure, air is delivered through valve 20 to feed device 22. Pressures in the range of about 1.5 to about 3.0 pounds per square inch (psi) may be utilized. Typically, pressures in the range of about 2.0 to about 2.5 psi are utilized. Waste material added to the feed device 22 is thereby carried from the feed device to the flash dryer 10 through conduit 24.

Connected to the flash dryer 10 through conduit 14 is a high volume air blower 12, followed by a heater 16. The temperature setting of heater 16 will vary depending upon a number of factors including type of volatile chemical compounds in the waste material, feed rate, and moisture content of the waste material. Inlet temperatures ranging from about 600° F. to about 1200° F. can be utilized. In a preferred embodiment, the dryer outlet temperature is set at less than about 200° F.

The waste material is dried by passing heated air through dryer 10 containing the waste material. As moisture laden waste material enters the dryer, it passes through the dryer and comes into contact with hot air. Waste material circulates at high velocities through the flash dryer 10, and, as the moisture evaporates, the waste material particles deagglomerate and lose mass, thereby increasing the surface area of the material. A more uniform particle size of the waste material is produced, thereby forming a more homogenous mixture of dried waste material and additive. Those particles that have lost sufficient moisture move toward the inner wall of the dryer 10 and exit the dryer through passage 28 with exhaust gas, and flow through conduit 34 to a cyclone separator. The exit passage 28 of the dryer 10 follows a curved classifier section which causes wet solid particles to recirculate in the loop. Dried particles recovered from the cyclone separator can be conveyed by belt conveyors, screw conveyors, and various other mechanisms.

The waste material is retained in the flash dryer for less than about six seconds, to allow for recirculation of large agglomerates. Typically, the average residence time of waste material particles in the dryer is about two seconds. The exiting dried solids have a temperature of about 120° F. to about 170° F. due to the limited time in the dryer and the relatively low temperature therein. In a preferred embodiment, the exiting dried solids have a temperature of about 125° F. to about 150° F. The exhaust gases at the dryer outlet have temperatures of about 170° F. to about 220° F. In a preferred embodiment, the exhaust gases have a temperature of about 190° F. to about 210° F. This low exhaust temperature ensures that hazardous materials such as mercury will not significantly volatilize and ensures that the adsorbent materials used to collect dust particles from the exhaust gases are not disabled. Typically, about 90% to about 99.5% of the water is removed from the waste material during the drying process. In a preferred embodiment, more than about 95% of the water is removed from the waste material.

Conduit 34 leads to a cyclone separator 38 for separating 85 to 95% of the solid material from the exhaust gases exiting the dryer 10 (FIG. 3). Typically, more than about 90% of solid dust particles are removed from the exhaust gases using cyclone 38. The dried waste material and collected dust particles pass from cyclone 38 through conduit 96 to the feed tube 98 of melting vessel 100. After solids removal, the exhaust gas passes from cyclone 38, through conduit 42, to a bag house collection and filtration system 44.

Bag house system 44 removes dust particles that have not been removed by the cyclone 38. Various high efficiency bag houses can be utilized in the invention and include those described in U.S. Pat. Nos. 2,369,649; 3,854,910; 3,871,845; 4,244,717; 4,343,632; 5,017,200; 5,096,476; and 5,887,797, among others, which are incorporated herein by reference, and are able to remove particles as fine as 0.05 microns.

In the bag house system 44, the remaining dust particles are removed from the exhaust gas at an overall efficiency of 99.99% (FIG. 4). Typically, the bag house system 44 includes three bag houses connected in series. Consecutive bag houses are provided in series so that subsequent bag houses can remove particles remaining after filtration by a preceding bag house or houses, and to ensure against release of large quantities of particles to the atmosphere in the event of failure or drop-off in efficiency of the first or second bag house in the series.

In each series, the dust particles are passed into a first bag house 46, which has an air to cloth ratio of about 4:1. This ratio may be higher or lower as necessitated by the quantity of dust particles present in the exhaust gas. About 99 to about 99.99% of the dust particles are removed from the exhaust gas. In a preferred embodiment, about 99.99% of the dust particles are removed overall. Preferably, 99.9% of dust particles larger than about 0.05 microns are removed in the first bag house.

After passing through the first bag house 46, the exhaust gas passes through exhaust fan 52 and is directed to the second bag house 48. The second bag house 48 has an air to cloth ratio of about 6:1, but this ratio may also be higher or lower as necessitated by the efficiency of the first bag house 46.

Depending upon the content of the waste material, the exhaust gases may be passed through an exhaust fan 54 and directed to a third bag 50 or vented directly to a combustion process. Combustion of exhaust gas may be carried out by means of an afterburner, flare, or incinerator, or the exhaust gases may be used as fuel for a boiler.

In the third bag house 50, the filter bags are coated with a particle bonded, volatile metal absorption medium, where the medium has a mesh particle size of less than about 400 to about 200 mesh. In a preferred embodiment, a particle mesh of about 325 is utilized. The content of the mesh is about 20% to about 50% of a metal alloy bonded to polypropylene and about 50% to about 80% of coal based activated carbon. In a preferred embodiment, about 20% of a 50/50 zinc/copper alloy bonded with polypropylene and about 80% coal based activated carbon is contained in the resultant mesh. The particle bonded volatile metal absorption media has the ability to remove more than about 95% of the volatile metal solid particles. In a preferred embodiment, more than about 99.99% of the remaining solid particles are removed from the exhaust gases.

The dust particles collected in the bag house system 44 may be collected by gravity feed and pass through a rotary valve (not shown) and conduits 92 into the feed tube 98 of the melting vessel 100. The dried waste material, including dust particles removed from the exhaust gas, pass through feed tube 98 into melting vessel 100. In a preferred embodiment, the waste material is fed to the melting vessel by gravity. The filtered gases exiting the bag house 44 are passed to a combustion furnace (not shown) by blower 56 and the combustion products are released into the atmosphere.

The melting vessel 100 includes a top 108, bottom 110, and a vertical side wall 112 preferably in the form of a circular cylinder. The melting vessel 100 is preferably a water-cooled, metallic vessel, which can withstand high temperatures up to about 3000° F. In one embodiment, the top 108 of the vessel is removable. Cooling water, maintained at a temperature preferably in the range of about 70° to about 180° F., is circulated through the side and bottom walls of the melting vessel 100 by a water cooling system 116. In a preferred embodiment, the temperature of the water is about 80° F. The bottom 110 of vessel 100 contains a layer of sand 128 and layer of clay 130 on top of the sand. The dried waste material entering vessel 100 is layered onto the clay layer 130.

The dried waste material is preferably melted electrically, using various procedures such as joule heating, plasma heating, microwave heating, induction heating, and electric arc heating. Alternatively, fossil fuel heating can be utilized, using, for example, a rotary kiln. Multi-fuel melters may also be used. In the preferred embodiment, the waste material is melted by establishing an electric current within the waste material itself, e.g. by utilizing electrodes which are initially immersed in the waste material in close proximity to each other, and then separated from each other. A variety of electrodes may be utilized, including graphite electrodes and molybdenum electrodes.

In this preferred embodiment, electrodes 106 are connected to a grounded power supply unit 102 through cables 104. The power supply to the electrodes 106 can be adjusted such that a sufficient temperature to melt the waste material is generated by the electrodes 106. Power requirements are typically in the range of about 460 to 1560 kwH/ton of melt. In a typical embodiment, a 2,700 KVA power supply unit may be utilized. The electrodes 106 are immersed in the dried waste material, the power supply unit 102 is activated, and molten material is thereby produced. Typically, the electrodes 106 extend into the waste material to a location near the bottom 110 of the melting vessel but above the surface of clay layer 130. The electrodes are movable in three dimensions for control of the melt temperature as well as for control of the melt zone.

Upon forming molten soil, process waste, ash, etc., using the techniques described above, a crust or "cold top" is formed. The resultant cold Lop floats on top of the melted waste material and functions as an interface between the incoming dried waste material and the molten waste material. The temperature above the cold top is about 150° F. to about 250° F., preferably less than about 200° F. The cold top thereby prevents volatile organic and metal compounds from escaping from the melted waste material while allowing the organic compounds to be thermally dissociated.

Gases produced during the melting process may be recovered through the top of the vessel 108 under a null pressure and are passed to exhaust vent 140. Typically the null pressures are from about 20 to about 30 inches $H_2O$, and preferably a null pressure of about 25 inches is utilized. The exhaust gases exit vessel 100 at a rate of about 500 to about 750 cubic feet per minute (cfm). Preferably, the gases are recaptured at a rate of about 1,000 to about 1,500 cfm, the exhaust fan being sized so that its flow rate exceeds the rate at which the off gases escape the cold top, thereby producing a negative pressure (suction). The gases have a temperature of about 100° F. to about 200° F. Preferably, the exhaust gases exit the vessel 100 at a temperature of about 150° F. The gases are passed from vent 140 to filter 142, where extraneous solid dust particles are removed. A variety of filtering systems may be utilized and include those described above for the cyclone and bag house of the invention and others known to those of skill in the art. The filtered gases then pass through conduit 144, to fan 146, through conduit 148, and into a combustion incinerator or afterburner 150. The resultant gaseous medium depleted of dust particles and hazardous materials is thereby discharged into the atmosphere. Alternate means may be provided for removing objectionable gases produced from the melting vessel and include absorbent materials, afterburners and gas scrubbers. The molten material passes through a water-cooled or gas-cooled port 120 into an insulated mold 124. In a preferred embodiment, the port may be an insulated steel cold tap for controlled removal of the melted waste material. Additional taps 122 may be utilized to dispense molten soil, process waste, ash, etc. The molten material is collected in and insulated mold 124 and slowly cooled to form vitrified product.

To achieve slow cooling, the vitrified waste products are allowed to cool gradually to ambient temperatures in an insulated graphite or steel mold over a cooling time which is at least twenty four hours. The slow cooling of vitrified waste products which have been removed from an uninsulated mold can also be accomplished in commercial annealing furnaces. The cooling down time is dependent on the size of the vitrified product. A small block about a cubic foot in size would take from six to eight hours to cool.

The molten solid may alternatively be collected in sand or water baths to form vitrified product. The molten waste material is then slowly cooled, preferably at room temperature, or rapidly cooled by dropping it into a water quenching trough.

The vitrified waste material formed according to the present invention contains inorganic waste materials. Such materials are immobilized in the glass matrix via chemical bonding, or encapsulated without direct interaction with the glass. The latter vitrified material is more durable and less prone to leaching conditions.

As will be apparent from the above description, the pre-treatment of waste material prior to vitrification, using low temperature flash drying, can significantly reduce the release of hazardous materials, especially volatilized metals into the atmosphere, and provides the additional advantage that the low temperature of the dryer exhaust preserves the ability of adsorbents in the filtration stages between the dryer and the melting vessel to function effectively.

An example illustrating the process according to the invention is as follows.

EXAMPLE

Municipal solid waste burner ash, can be accommodated by a modular melt furnace having a capacity of 100 tons per day, in combination with a toroidal loop dryer having an internal channel diameter of 16 inches and measuring 9 feet high by 6 feet wide. The inlet temperature to the dryer is about 1100° F. and the dryer outlet temperature is about 200° F. At a feed rate of about 5900 lbs. per hour, the dryer delivers about 5000 lbs. per hour of dried material to the melt furnace.

The melt furnace should be about 10 feet in diameter, with a vertical wall about 4.5 feet high. The melting unit is supplied with electric power through th ree electrodes, at 900 KVA per electrode, for a total of 2700 KVA. About 460 KWh are required to melt one ton of ash. Municipal solid ash requires about 1.5 hours to reach a molten state, at 2900° F. After the melt temperature is reached, the melting unit runs continuously with fresh feed entering the top so that the surface temperature is maintained at about 200° F. Cooling water is circulated through the outer wall jacket at about 400 gpm and exits with a temperature rise of about 10° F. over ambient.

The discharge from the melting unit is a molten stream having a temperature of about 2850° F. The molten material is collected in a mold and held at a temperature of about 2700° F. for one hour, after which it is allowed to cool to ambient temperature. Cooling requires approximately four hours.

Instead of collecting the molten material in a mold, it can be dropped into a quick quench tank to form a grit, or it can be dropped onto a spinning wheel to form fibers. Various products can be produced by the apparatus and process described, including shore erosion blocks, tiles, non-leachable landfill in block or pellet form, future mineral banks, blast cleaning grit, roadbed fill, grog for refractories, cement additives, abrasives, ceramic fibers, mineral wool, vacuum formed products, wallboard, textile fibers, fireproof cloth and industrial furnace linings.

Various modifications can be made to the apparatus and process described. For example, although a loop-type flash dryer is preferred for its ability to classify solid matter, to retain material not fully deagglomerated, and to deliver a more uniform dried material, some of the advantages of the invention can be realized using straight through flash dryers and other similar devices.

Still other modifications may be made to the invention described above without departing from the scope as defined in the following claims.

What is claimed is:

1. A process for vitrifying a waste material containing environmentally hazardous materials comprising the steps of:

drying the waste material using a flash dryer and transferring dried waste material from the flash dryer into a melting vessel, wherein the drying and transferring of waste material are carried out at temperatures low enough to prevent substantial volatilization of hazardous metals and metal compounds contained in the waste material;

melting the waste material in the melting vessel;

collecting the melted waste material such that the waste exiting the from the flash dryer is at a temperature of less than about 250 deg F.; and cooling the melted waste material to form a vitrified mass of product.

2. The process of claim 1, wherein the environmentally hazardous materials comprise hazardous metals or metal compounds.

3. The process of claim 1, wherein the waste material is agglomerated prior to the drying step, and wherein the surface area of the agglomerated waste material is increased in the drying step.

4. The process of claim 1, wherein the waste material is premixed, prior to the drying step, with an additive selected from the group consisting of fly ash, bottom ash, alumina, silica, and iron oxide.

5. The process of claim 4, wherein, in said transferring step, waste material and said additive are transferred into said melting vessel together as a mixture, and wherein the transferred waste material and additive mixture is homogeneous.

6. The process of claim 1, wherein said waste material, prior to the drying step, has a water content, and wherein the flash dryer removes more than about 95% of said water content from the waste material.

7. The process of claim 1, wherein the melting step comprises establishing an electric current within the waste material in the melting vessel to heat the waste material.

8. The process of claim 1, wherein a cold top is formed during the melting step and the cold top prevents volatile metallic elements and volatile metal compounds from escaping from the melted waste material.

9. The process of claim 1, wherein exhaust gases are produced during the melting step, and are vented, filtered, and combusted.

10. The process of claim 1, wherein the melted waste material is collected in an insulated mold.

11. The process of claim 1, wherein the drying step is carried out by circulating the waste material in a loop flash dryer.

12. A waste glass prepared by the process of claim 1.

13. The process of claim 1, wherein drying in the drying step is carried out by contacting the waste material with a gas, wherein the gas exits from the flash dryer, and wherein the temperature of the gas as it exits from the flash drying is in the range from about 170° F. to 220°F.

14. The process of claim 1, wherein drying in the drying step is carried out by contacting the waste material with a gas, wherein the gas exits from the flash dryer, and wherein the temperature of the gas as it exits from the flash drying is in the range from about 190° F. to 210° F.

15. The process of claim 1, wherein drying in the drying step is carried out by contacting the waste material with a gas, wherein the waste material exits from the flash dryer, and wherein the temperature of the waste material as it exits from the flash dryer is in the range from about 120° F. to 170° F.

16. The process of claim 1, wherein drying in the drying step is carried out by contacting the waste material with a gas, wherein the waste material exits from the flash dryer, and wherein the temperature of the waste material as it exits from the flash dryer is in the range from about 125° F. to 150° F.

17. The process of claim 1, wherein the waste material is retained in the flash dryer for less than about six seconds.

18. A process for vitrifying a waste material containing environmentally hazardous metals or metal compounds comprising the steps of:

drying the waste material using a flash dryer such than the waste exiting the from the flash dryer is at a temperature of less than about 250 deg F.;

melting the dried waste material in a melting vessel;

exhausting gas from the flash dryer, before the gas reaches the melting vessel, through an adsorbent material capable of adsorbing volatilized metals;

collecting the melted waste material;

cooling the melted waste material to form a vitrified mass of waste material;

wherein the drying in the flash dryer is carried out at a temperature sufficiently low to prevent heat in the exhausted gas from disabling the adsorbent material.

19. The process of claim 18, wherein the flash dryer is a loop dryer, wet waste material is circulated through the loop dryer, dried waste material is centrifugally separated from the wet waste material in the dryer and passed out therefrom along with gas, and the dried waste material is separated from the gas before the gas is exhausted through said adsorbent material.

* * * * *